United States Patent [19]

Hogan

[11] Patent Number: 4,594,724
[45] Date of Patent: Jun. 10, 1986

[54] BYPASS METHOD AND APPARATUS FOR DEBOUNCING A MECHANICAL SWITCHING ELEMENT IN A DATA COMMUNICATIONS NETWORK

[75] Inventor: Thomas C. Hogan, Natick, Mass.

[73] Assignee: Prime Computer, Inc., Natick, Mass.

[21] Appl. No.: 579,094

[22] Filed: Feb. 10, 1984

[51] Int. Cl.[4] .................................. H04B 1/38
[52] U.S. Cl. ................................ 375/7; 375/36; 375/121
[58] Field of Search ........... 375/7, 36, 121; 455/73, 455/78; 361/3, 8, 13; 370/86; 307/113, 137, 139

[56] References Cited

U.S. PATENT DOCUMENTS

| | | | |
|---|---|---|---|
| 3,449,591 | 6/1969 | Hoover | 307/136 |
| 3,500,459 | 3/1970 | Battin et al. | 455/78 |
| 3,555,353 | 1/1971 | Casson | 317/11 |
| 3,736,466 | 5/1973 | Fox et al. | 361/8 |
| 3,783,305 | 1/1974 | Lefferts | 307/136 |
| 4,025,820 | 5/1977 | Penrod | 361/8 |
| 4,074,333 | 2/1978 | Murakami et al. | 361/13 |
| 4,152,634 | 5/1979 | Penrod | 361/13 |
| 4,301,489 | 11/1981 | Stich | 307/117 |
| 4,356,525 | 10/1982 | Kornrumpf et al. | 361/13 |
| 4,403,246 | 9/1988 | Thornberry | 358/166 |
| 4,445,183 | 4/1984 | McCollum et al. | 361/13 |

Primary Examiner—Marc E. Bookbinder
Assistant Examiner—Stephen Chin
Attorney, Agent, or Firm—Lahive & Cockfield

[57] ABSTRACT

An apparatus and method, for connecting a node to and disconnecting a node from a high speed data communications network, has a dead man switching element and high speed solid state switching circuitry interconnected therewith to avoid the effects of mechanical contact bounce normally associated with operation of the mechanical switching element. Thereby, massive data losses on high speed communications paths, and token loss in a token-passing ring network, are substantially avoided. The switch has the solid state switching circuitry connected both in parallel and in series with its mechanical contacts for providing node isolation and communications path bypass channels during the time that the mechanical switch bounce occurs. The alternate paths are maintained during a change of state of the mechanical device, that is, when the node is being connected or disconnected from the communications network.

16 Claims, 5 Drawing Figures

BYPASS METHOD AND APPARATUS FOR DEBOUNCING A MECHANICAL SWITCHING ELEMENT IN A DATA COMMUNICATIONS NETWORK

The invention relates generally to high speed data communications networks and in particular to an improved apparatus and method for connecting to and disconnecting from a high speed data communications network.

Traditionally, data communications network nodes, when not in operation or when unpowered, employ mechanical relays to remove or disconnect the node from the communications network, that is, to bypass the node. As a consequence, each time the relay at a node changes state, that is, when a node comes on or leaves the network, bounce of the mechanical relay contacts can cause massive data errors. In a typical high speed data communications network, thousands of message bits can be lost; and if the data channel is a token passing ring network, there usually results a loss of the token. When the token is lost, token recovery mechanisms must be invoked which inevitably results in a further reduction of network performance. The problem is especially acute for large networks where nodes can be entering or leaving the network on a frequent basis. The problem is even further aggravated when the token is lost on a large token passing ring network, because token recovery speed is related to the size of the network.

One logical solution is therefore to remove the mechanical switch from the network. However, the use of a mechanical switch to remove or decouple the node from the network, and hence act as a "dead man switch" when power is lost, is highly desirable because a mechanical switch, such as a relay, provides a more reliable dead man switch than does a solid state relay. That is, solid state switches and relays are more likely to fail in a state which is permanently "on" or "activated" than are mechanical relays. However, mechanical relays are slow and the contacts tend to bounce when being changed from one state to another. Hence, the time it takes for a mechanical relay to "debounce" can easily be 100,000 bit times.

Objects of the invention are therefore a dead man switch construction and method which does not result in significant data loss on a high speed data communications network, which does not result in token loss in a token passing ring network, which provides reliable connect/disconnect of a node from a network, which is simple and inexpensive to manufacture, and which can be employed with existing network configurations.

SUMMARY OF THE INVENTION

The invention relates to apparatus and methods for connecting a node to and disconnecting a node from a high speed data communications network. The apparatus of the invention features a dead man mechanical switch having mechanical contacts for connecting, in an activated state, the node to the network and for disconnecting, in its deactivated state, the node from the network. A first high speed solid state switching circuitry, having a high impedance state and a low impedance state, is connected to at least two of the mechanical switch contacts for bypassing the node in its low impedance state. A second high speed solid state switching circuitry, also having a high impedance state and a low impedance state, is connected in series with at least one contact of the mechanical switch for isolating the node from the network when the second switch is in its high impedance state. Circuitry is also provided for controlling the operation of the mechanical switch and the first and second solid state switching circuitries in a timed sequence for substantially minimizing the effect of mechanical contact bounce on the communication of data along the network.

The method of the invention for connecting a node to and disconnecting the node from a high speed data communications network features the steps of connecting an electrically controlled mechanical switching element to the node and the network, whereby the switching element has an activated state for connecting the node to the network and a deactivated state for disconnecting the node from the network. The method further features connecting a first high speed bounceless switching circuit in parallel across contacts of the mechanical switching element for causing the node to be bypassed when the switching circuit is in a low impedance state; connecting a second high speed bounceless switching circuit in series with contacts of the mechanical switch for blocking signal transmission to the node when the second high speed switching circuit is in a high impedance state; and operating the mechanial switching element and the first and second high speed switching circuitries in timed sequence for substantially minimizing the effect of the "bounce" from the contacts of the mechanical switching element upon the reliable communication of data on the network.

BRIEF DESCRIPTION OF THE DRAWINGS

Other objects, features, and advantages of the invention will appear from the following description of particular embodiments taken together with the drawings in which.

DESCRIPTION OF PARTICULAR EMBODIMENTS

Figure 1:
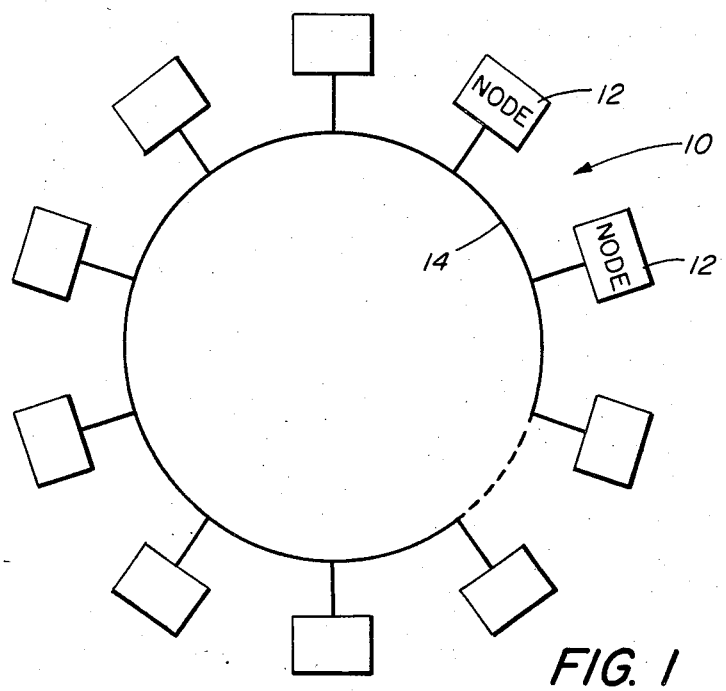
FIG. 1 is a typical ring communications network in which the invention can be employed.

Referring to FIG. 1, a typical data communications network 10, illustrated as a ring network, has a plurality of nodes 12 which can connect thereto. Each node 12 is typically an independent operating station having its own receiving and transmitting circuitry for receiving and transmitting data from and onto the data communications bus 14. The node can be taken "off line" or disconnected from the communications bus for any of a number of reasons, for example, power failure, internal circuit analysis, repair and maintenance, etc.

Importantly, when the circuit is removed from the bus because of, for example, a power failure, it is desirable that this occur automatically and reliably. For this reason a mechanical switching element, generally a mechanical relay, is provided as a dead man switch.

Figure 2:
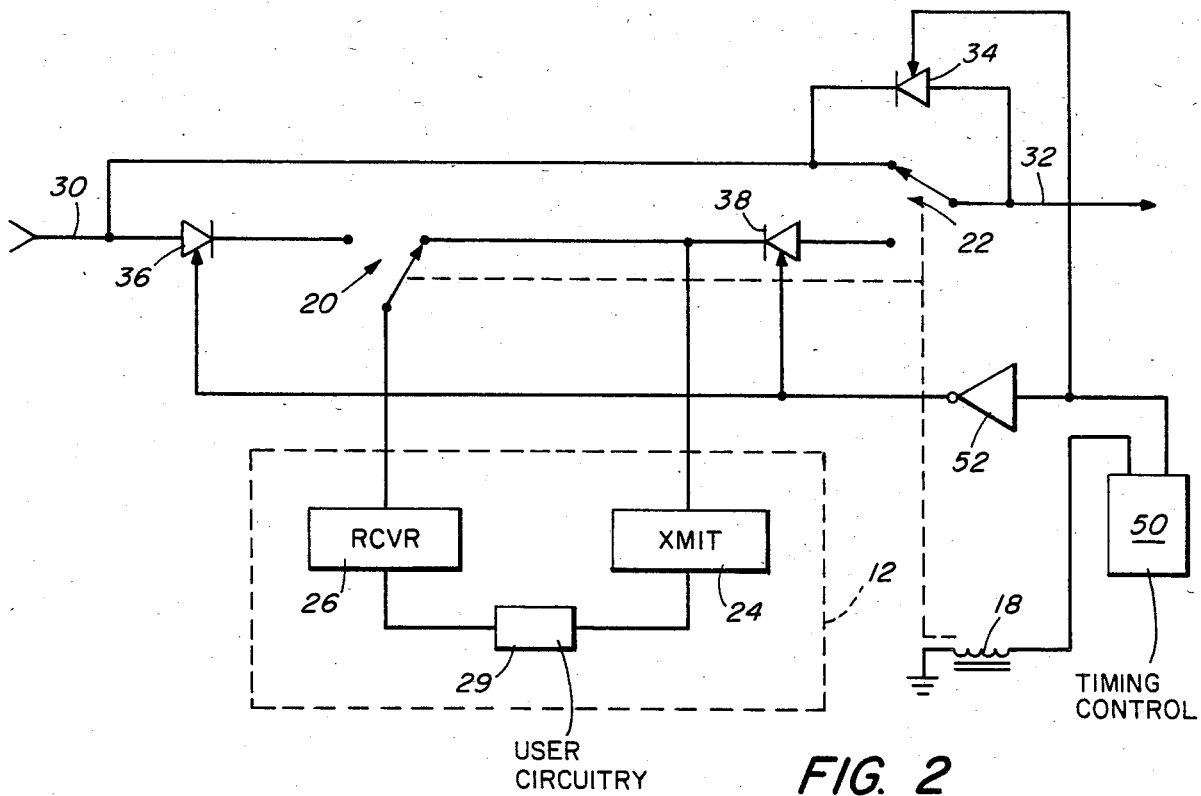
FIG. 2 is a first preferred circuit configuration employing the invention.

Referring to FIG. 2, a typical dead man switch is a mechanical relay 18, electrically actuated, and illustrated as having a double pole, double throw contact configuration. The contact poles 20 and 22 operate together. In the configuration shown in FIG. 2, the node, as is well known in the art, has a transmitter 24 and a receiver 26 and associated connected user circuitry 29. The node can be disconnected from the data bus input by connecting bus input portion 30 directly to bus output portion 32 as is illustrated. In this mode of operation, the mechanical relay 18 is in its deactivated state. This is an unpowered state so that when power is lost, the node 12 is automatically bypassed by or disconnected from the data communications network.

When the node is to be connected to the communications network, the mechanical relay 18 is activated, changing the position of each wiper of the contacts 20 and 22 so that the receiver and transmitter of the node are connected respectively to the cable portions 30 and 32, that is the input and output cable portions respectively. However, when the mechanical contacts switch from one position to the other, mechanical contact bounce is so long that significant data, including possibly the token if the network is of a token passing type, can and typically will be lost.

There is therefore provided according to the invention a plurality of fast acting, solid state switches 34, 36, and 38, which substantially eliminate the effects of mechanical switch bounce. The solid state switches are preferably of the PIN type which can be turned on or off under the control of an applied electrical signal. Each high speed solid state switch has a low impedance state and a high impedance state. The solid state switches 34, 36, and 38 can be operated to bypass the node or to connect the node to the network without the "bounce" of the mechanical relay. On the other hand, the mechanical switch is still necessary to provide the dead man control for unpowered bypass.

According to the illustrated embodiment, switch 34 connects in parallel across the contacts 22 of the mechanical switch. Thus, when solid state switch 34 is in a low impedance state, there is provided a low impedance connection from bus portion 30 to bus portion 32. In addition, the illustrated switches 36 and 38 connect in series between, respectively, the input portion 30 and the node receiver and between the output portion 32 and the node transmitter. These switch elements, in a high impedance state, isolate the node 12 from the ring network. Thus, when switch element 34 is in a low impedance state and switch elements 36 and 38 are in a high impedance state, it does not matter what state the relay contacts 20 and 22 are in for the node will always be "bypassed" or disconnected from the network.

According to the preferred embodiment of the invention, a timing control element 50 operates relay 18 and switches 34, 36, and 38. When the mechanical relay 18 is to be switched, element 50 places high speed switch 34 in a low impedance state, and high speed switches 36 and 38 in a high impedance state. An inverter 52 ensures that switches 36 and 38 are in a state opposite to that of switch 34. Thus, the bounce of the mechanical contacts is effectively isolated from the data stream and the data is substantially unaffected by the node coming onto or leaving the network. In effect, the relay contacts are bypassed. It may occur, however, that one or two bits of the data are affected as the high speed switches change state. After a sufficient duration has passed for the bounce of the mechanical system to damp out, the high speed switching elements 34, 36, and 38 can be switched to provide the correct operation (node connected or bypassed) of the apparatus.

Figure 4:
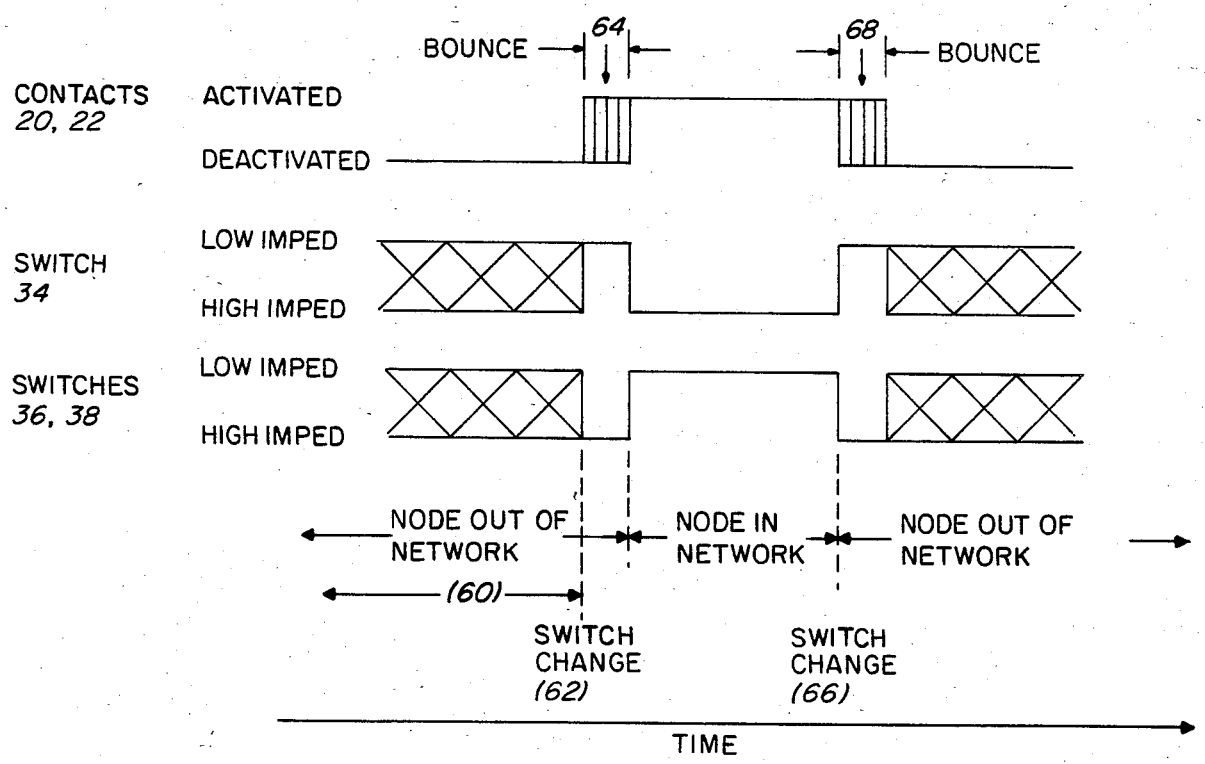
FIG. 4 is a timing diagram for several electrical signals of the circuit of FIG. 2.

Referring to FIG. 4, a typical cycle of operation of the switch elements of FIG. 2 is diagrammatically illustrated. The node is initially assumed to be disconnected from the network. During this time, illustrated as region 60, the mechanical relay is in its deactivated state and the state of switch elements 34, 36, and 38 is arbitrary. At the time indicated by a switch change 62 the mechanical relay is activated, switch element 34 is forced to the low impedance state and switch elements 36 and 38 are switched to a high impedance state. Preferably, the actuation of switch elements 34, 36, and 38 to their respective assigned states, during a change of state of the relay, occurs just prior to activation of the relay. There results, as the relay changes state, a contact bounce, illustrated as occurring over a region 64, during which time switch 34 must remain in the low impedance state to provide a bypass of the node, and to effectively prevent the effects of contact bounce from being seen on the network. Correspondingly, switch elements 36 and 38 must remain in the high impedance state to isolate the node from the network to avoid erroneous data at the node. Once the time of the contact bounce has passed, switch 34 switches to a high impedance state while switches 36 and 38 switch to a low impedance state, thereby connecting the node into the network. At this time the contacts of the mechanical relay have settled to their normal activated state.

When the node is taken out of or removed from the network, a switch change occurs at 66 at which time switch 34 again changes to a low impedance state and switches 36 and 38 change to a high impedance state. This immediately removes the node from the network. However, because of contact bounce during the time indicated at 68, the relay contacts will not have settled. Once those contacts have settled at the end of the "bounce" time, the states of switches 34, 36, and 38 can again be arbitrarily set since the relay will control bypassing of the node. Preferably, in their arbitrary position, switches 34, 36, and 38 are set so that swtich 34 is in a low impedance state and switches 36 and 38 are in a high impedance state to emphasize the "bypass" nature of the configuration.

Figure 3:
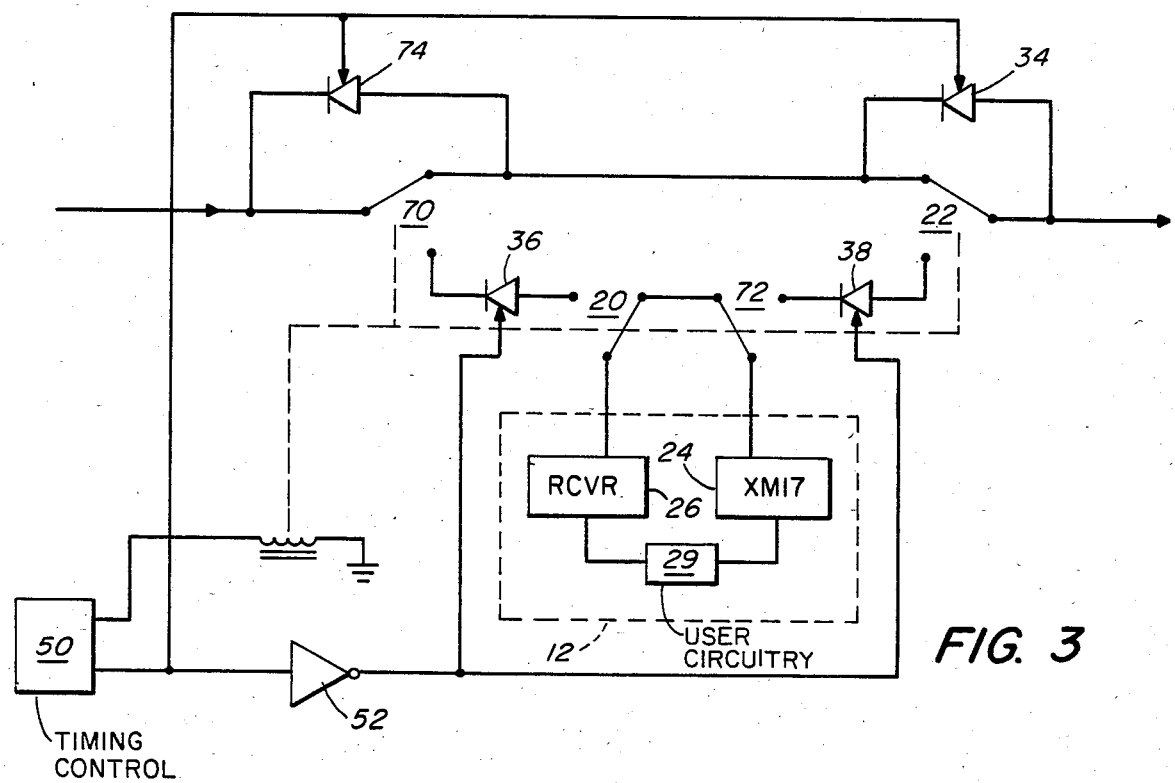
FIG. 3 is a second circuit configuration according to the invention.

Referring now to FIG. 3, in an alternative embodiment of the invention, a third and a fourth set of relay contacts 70, 72 and correspondingly a fourth high speed switch 74 are added to the network node thereby providing a somewhat more complex construction. In this configuration the high speed switch 74 operates in a corresponding manner to switch 34 to bypass contacts 70 during "contact bounce". The isolation of the node is completely controlled by the mechanical relay contacts 20, 22, 70, and 72 in combination with high speed switch elements 36 and 38. The operation of these switches and their associated mechanical relay contacts is functionally identical to that shown in FIG. 4 for the configuration of FIG. 2.

Figure 5:
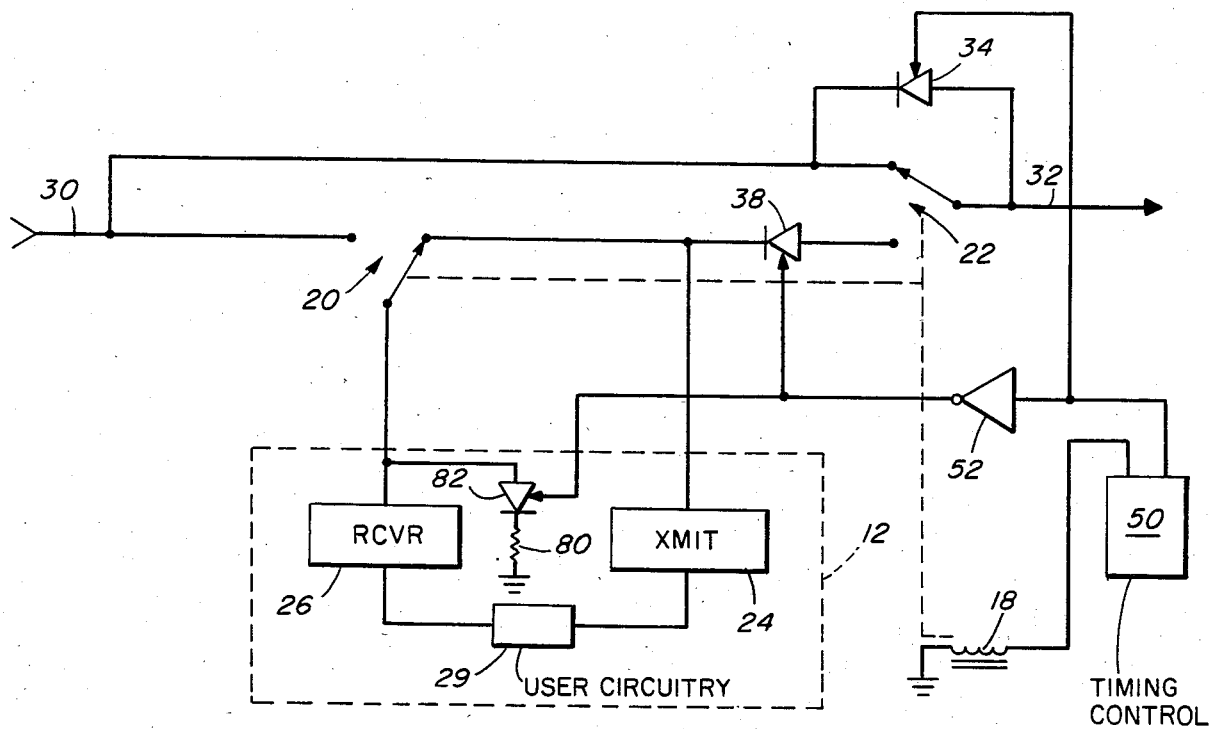
FIG. 5 is a third circuit configuration corresponding substantially to the configuration of FIG. 2.

Referring now to FIG. 5, in a typical embodiment of the invention, the receiver is provided with a termination impedance 80 which is matched to the impedance of the network data bus. If the high speed switching element 36 of FIG. 2 is removed from the circuit embodiment, as in FIG. 5, the line can see, during relay switching, the receiver termination impedance, which acts to set up disruptive standing waves on the data path. This is an undesirable result; and therefore, a high speed switching element 82, controlled in a manner identical to that of switching element 38, is inserted in series with the impedance 80 at the receiver to effectively remove the matched impedance from the line when the node is disconnecting from or connecting to the network. This advantageously removes from the network the adverse effects caused by the termination impedance during relay switching.

Thus in accordance with the invention minimal data communications loss and network interference can be achieved while maintaining the high reliability of mechanical dead man switch.

Additions, subtractions, deletions, and other modifications of the disclosed particular embodiments of the invention will be apparent to those skilled in the art and are within the scope of the following claims.

What is claimed is:

1. Apparatus for connecting a node to and disconnecting said node from a high speed data communications network comprising
   a mechanical switching element having an activated state and a deactivated state, said mechanical element having contacts for connecting, in said activated state, said node to said communications network and for disconnecting, in said deactivated state, said node from said communications network,
   a first high speed solid state switching means having a high impedance state and a low impedance state, said switch means being connected to at least two of said mechanical contacts for bypassing said node in said low impedance state,
   a second high speed solid state switching means having a high impedance state and a low impedance state, said second switching means being connected in series with at least one mechanical element contact for isolating said node from said communications network,
   means for operating said mechanical element and said first and second solid state switching means in timed sequence to substantially minimize the effect of mechanical contact bounce of the communication of data on said network.

2. The apparatus of claim 1 wherein
   said mechanical element comprises a relay having at least a double pole-double throw contact configuration, one said throw corresponding to the activation state of said relay and the other throw corresponding to the deactivation state of said relay, and further comprising
   means for connecting said first switching means in parallel with the contacts of said relay providing a disconnect data path when said relay is in either one of its deactivation or activation states, and
   means for connecting said second switching means in series with contacts of said relay for providing a node isolation from the network data path in said deactivation state.

3. The apparatus of claim 2 further wherein
   said node has a data transmitter and a data receiver,
   said relay has first double throw contacts associated with said receiver and second double throw contacts associated with said transmitter at least for delivering data from said node to said network,
   said first switching means is connected in association with said second contacts, and
   said second switching means further comprises
   a third and a fourth high speed solid state switching means, each having a high impedance state and a low impedance state, said third means being connected in series with a said first double throw contact and said fourth means being connected in series with a said second contact.

4. The apparatus of claim 3 further wherein said first switching means further comprises
   a fifth switching means connected in parallel with said first contacts.

5. The apparatus of claim 3 further wherein, at said node,
   said first contacts, in said relay deactivated state, connect said node transmitter output to said node receiver input.

6. The apparatus of claim 3 wherein each said first and second switching means comprise PIN diode switching elements.

7. The apparatus of claim 1 further comprising
   means for controlling operation of said mechanical element and said first and second switching means, said control means being operative for operating said first switch means to its low impedance state and said second switch means to its high impedance state for a time duration extending from at least when said mechanical switching element begins to change from one said state to its other state until mechanical contact bounce terminates.

8. The apparatus of claim 7 further wherein said controlling means further comprises means for operating said first and second switching means in opposite states.

9. The apparatus of claim 1 wherein
   said node has a data transmitter and a data receiver,
   said receiver having a series connection of a termination impedance and a third solid state high speed switching means for terminating the data network at said receiver, and
   said operating means activating said third switching means to a high impedance state at least when said node is connecting to and disconnecting from said network.

10. A method for connecting a node to and disconnecting said node from a high speed data communications network comprising the steps of
    connecting an electrically controlled mechanical switching element to said node and said network whereby said switching element has an activated state for connecting said node to said network and a deactivated state for disconnecting said node from said network,
    connecting a first high speed bounceless switching means in parallel across contacts of said mechanical switching element for bypassing the node in a low impedance state of the switching element,
    connecting a second high speed bounceless switching means in series with at least one mechanical switch contact for blocking signal transmission from the node when the second high speed element has a high impedance state, and
    operating the mechanical switching element and the first and second high speed switching means in timed sequence for substantially minimizing the effect of the bounce from the contacts of the mechanical element on the communications of data on the network.

11. The method of claim 10 further comprising the steps of
    alternately connecting said mechanical element in a first activation configuration wherein said mechanical element connects the network to the node and a second deactivation configuration wherein said mechanical element decouples said node from said network, operating the first switching means for providing a parallel decoupling path during a change of state of said switch element, said parallel path decoupling said node from said network, and operating said second switch means for isolating said node from said network during a change of state of said mechanical switch.

12. The method of claim 11 further comprising the steps of providing two sets of contacts for said mechanical switching element for connecting and disconnecting said node and said network, further providing two groups of first and second switching means for operation respectively in parallel with contacts of said mechanical element and in series with said mechanical element contacts.

13. The method of claim 10 further comprising the step of operating said mechanical switching element and said switching means so that said first switching means is in a low impedance state and said second switching means is in a high impedance state for at least the entire time duration during which the mechanical element is changing from one of its states to the other of its states.

14. The method of claim 13 further comprising the step of operating said first and second switching means in opposite states, whereby said first switching means is in its low impedance state when the second switching means is in its high impedance state and the first switching means is in its high impedance state when the second switching means is in its low impedance state.

15. The method of claim 14 further comprising the step of operating said first switching means in its high impedance state when the mechanical switch element is in its activated state.

16. The method of claim 11 further comprising the steps of connecting a line termination impedance across said data network at a receiver of said node when said node is connected to said network, and disconnecting said line termination impedance from said data network at said receiver at least when said node is connecting to and disconnecting from said network.

* * * * *